United States Patent
Kuwata et al.

(10) Patent No.: US 6,914,628 B1
(45) Date of Patent: Jul. 5, 2005

(54) IMAGE PROCESSING APPARATUS AND METHOD, AND MEDIUM CONTAINING IMAGE PROCESSING CONTROL PROGRAM

(75) Inventors: Naoki Kuwata, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/197,643

(22) Filed: Nov. 23, 1998

(30) Foreign Application Priority Data

Nov. 25, 1997 (JP) .............................................. 9-323013
Aug. 28, 1998 (JP) ............................................ 10-243461

(51) Int. Cl.$^7$ ........................ H04N 9/083; H04N 5/217; H04N 5/208; H04N 1/40; G06K 9/40
(52) U.S. Cl. ...................... 348/272; 348/273; 348/241; 348/252; 382/254; 358/461
(58) Field of Search ................................ 348/272, 273, 348/241–247, 252, 253, 251, 625; 382/162, 167, 254, 264, 266, 274; 358/461, 463

(56) References Cited

U.S. PATENT DOCUMENTS

| | | | | |
|---|---|---|---|---|
| 5,027,195 A | * | 6/1991 | Cooley et al. ............... | 358/500 |
| 5,031,227 A | * | 7/1991 | Raasch et al. ................. | 382/22 |
| 5,390,264 A | * | 2/1995 | Ishihara et al. .............. | 382/266 |
| 5,396,441 A | | 3/1995 | Ozawa ......................... | 364/577 |
| 5,552,827 A | * | 9/1996 | Maenaka et al. ............ | 348/266 |
| 5,561,724 A | * | 10/1996 | Kido et al. .................. | 382/264 |
| 5,614,947 A | | 3/1997 | Tanizoe et al. .............. | 348/241 |
| 5,649,031 A | * | 7/1997 | Nakamura et al. .......... | 382/254 |
| 5,666,443 A | * | 9/1997 | Kumashiro .................. | 382/266 |
| 5,712,924 A | * | 1/1998 | Fujimoto et al. ............ | 382/162 |
| 5,852,468 A | * | 12/1998 | Okada ......................... | 348/272 |
| 5,901,242 A | * | 5/1999 | Crane et al. ................. | 382/166 |
| 6,181,376 B1 | * | 1/2001 | Rashkovskiy et al. ...... | 348/273 |
| 6,323,901 B1 | * | 11/2001 | Ukita .......................... | 348/273 |
| 6,388,706 B1 | * | 5/2002 | Takizawa et al. ........... | 348/273 |

FOREIGN PATENT DOCUMENTS

WO 97/34423 9/1997 ............ H04N/9/04

\* cited by examiner

Primary Examiner—Andrew Christensen
Assistant Examiner—Nhan Tran
(74) Attorney, Agent, or Firm—Sughrue Mion, PLLC

(57) ABSTRACT

Conventionally, in image processing using a smoothing filter, the large amount of calculation for 25× the number of pixels takes much processing time. A computer 21 as the nucleus of image processing determines whether or not a pixel of interest is a color blur pixel, based on the intensity of a low-density element color, at steps S130 and S140. If the pixel is a color blur pixel, the computer 21 determines whether or not the color blur pixel is an edge pixel at step S150. If the pixel is not an edge pixel, the computer 21 uses a smoothing filter at step S152, while if the pixel is an edge pixel, the computer 21 uses a median filter at step S154, in image processing to reduce the color blur. This reduces the amount of calculation and realizes high-speed image processing.

19 Claims, 23 Drawing Sheets

FIG.7
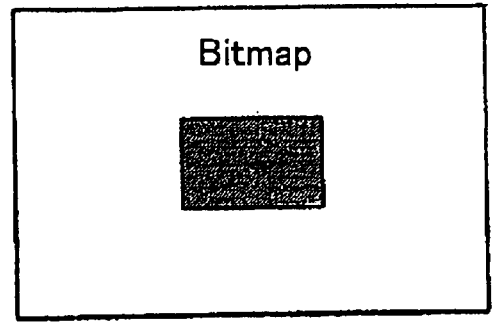
(a)
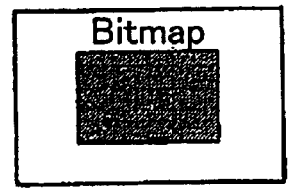
(b)

| 1 | 1 | 1 |
|---|---|---|
| 1 | 1 | 1 |
| 1 | 1 | 1 |

3 × 3 pixels (b)

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

5 × 5 pixels (c)

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

7 × 7 pixels

FIG.9
(a) 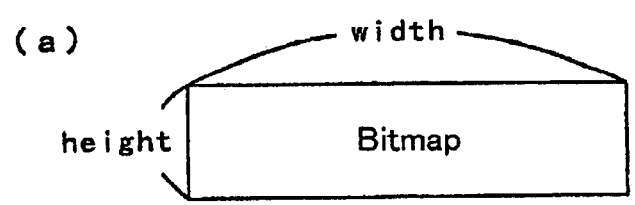
(b) 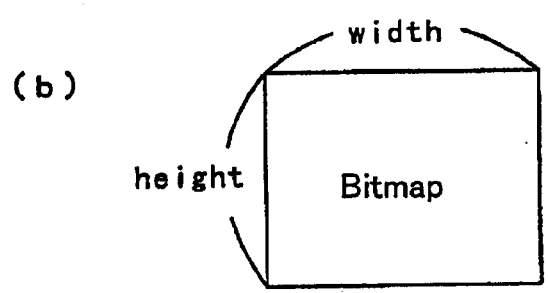

FIG.11

| ΔRB(x−1, y−1) |  | ΔRB(x+1, y−1) |
|---|---|---|
|  | ΔRB(x, y) |  |
|  |  |  |

FIG.12

| C1 (x−1, y−1) C2 (x−1, y−1) | | |
|---|---|---|
| | C1 (x, y) C2 (x, y) | |
| | | |

FIG.13

| C1 (x-1, y-1)<br>C2 (x-1, y-1) | C1 (x, y-1)<br>C2 (x, y-1) | C1 (x+1, y-1)<br>C2 (x+1, y-1) |
|---|---|---|
| C1 (x-1, y)<br>C2 (x-1, y) | C1 (x, y)<br>C2 (x, y) | C1 (x+1, y)<br>C2 (x+1, y) |
| C1 (x-1, y+1)<br>C2 (x-1, y+1) | C1 (x, y+1)<br>C2 (x, y+1) | C1 (x+1, y+1)<br>C2 (x+1, y+1) |

FIG.14

| | C1 (x, y-1)<br>C2 (x, y-1) | |
|---|---|---|
| C1 (x-1, y)<br>C2 (x-1, y) | C1 (x, y)<br>C2 (x, y) | C1 (x+1, y)<br>C2 (x+1, y) |
| | C1 (x, y+1)<br>C2 (x, y+1) | |

FIG.15

| C1 (x−1, y−1)<br>C2 (x−1, y−1) |                        | C1 (x+1, y−1)<br>C2 (x+1, y−1) |
|---|---|---|
|                                 | C1 (x, y)<br>C2 (x, y) |                                 |
| C1 (x−1, y+1)<br>C2 (x−1, y+1) |                        | C1 (x+1, y+1)<br>C2 (x+1, y+1) |

Central value

| 1 | 8 | 1 |
|---|---|---|
| 8 | 100 | 8 |
| 1 | 8 | 1 |

3 × 3 pixels
(total value of weighting coefficients···136)

(b)

| 0 | 2 | 4 | 2 | 0 |
|---|---|---|---|---|
| 2 | 21 | 46 | 21 | 2 |
| 4 | 46 | 100 | 46 | 4 |
| 2 | 21 | 46 | 21 | 2 |
| 0 | 2 | 4 | 2 | 0 |

5 × 5 pixels
(total value of weighting coefficients···400)

(c)

| 0 | 1 | 3 | 4 | 3 | 1 | 0 |
|---|---|---|---|---|---|---|
| 1 | 6 | 18 | 25 | 18 | 6 | 1 |
| 3 | 18 | 50 | 71 | 50 | 18 | 3 |
| 4 | 25 | 71 | 100 | 71 | 25 | 4 |
| 3 | 18 | 50 | 71 | 50 | 18 | 3 |
| 1 | 6 | 18 | 25 | 18 | 6 | 1 |
| 0 | 1 | 3 | 4 | 3 | 1 | 0 |

7 × 7 pixels
(total value of weighting coefficients···900)

FIG.20

| IN | G&B | R | Y | G1 | G2 | C1' | G2' | R' | B' | G' |
|---|---|---|---|---|---|---|---|---|---|---|
| 1.00 | 1.00 | 1.00 | 1.00 | 0.00 | 0.00 | 0.00 | 0.00 | 1.00 | 1.00 | 1.00 |
| 1.00 | 1.00 | 1.00 | 1.00 | 0.00 | 0.00 | 0.00 | 0.00 | 1.00 | 1.00 | 1.00 |
| 1.00 | 1.00 | 1.00 | 1.00 | 0.00 | 0.00 | 0.00 | 0.00 | 1.00 | 1.00 | 1.00 |
| 1.00 | 1.00 | 1.00 | 1.00 | 0.00 | 0.00 | 0.00 | 0.00 | 1.00 | 1.00 | 1.00 |
| 1.00 | 1.00 | 1.00 | 1.00 | 0.00 | 0.00 | 0.05 | -0.02 | 1.05 | 1.00 | 1.00 |
| 1.00 | 1.00 | 1.00 | 1.00 | 0.00 | 0.00 | 0.10 | -0.04 | 1.10 | 0.98 | 0.98 |
| 1.00 | 1.00 | 1.00 | 1.00 | 0.00 | -0.15 | 0.10 | -0.04 | 1.10 | 0.96 | 0.96 |
| 1.00 | 0.50 | 1.00 | 0.65 | 0.35 | -0.15 | 0.10 | -0.04 | 0.75 | 0.96 | 0.96 |
| | 0.00 | 0.50 | 0.15 | 0.35 | 0.00 | 0.10 | -0.04 | 0.25 | 0.61 | 0.61 |
| | 0.00 | 0.00 | 0.00 | 0.00 | 0.00 | 0.10 | -0.04 | 0.10 | 0.11 | 0.11 |
| | 0.00 | 0.00 | 0.00 | 0.00 | 0.00 | 0.10 | -0.04 | 0.10 | -0.04 | -0.04 |
| | 0.00 | 0.00 | 0.00 | 0.00 | 0.00 | 0.05 | -0.02 | 0.05 | -0.04 | -0.04 |
| | 0.00 | 0.00 | 0.00 | 0.00 | 0.00 | 0.00 | 0.00 | 0.00 | -0.02 | -0.02 |
| | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 |

FIG.21

| IN | G&B | R | Y | C1 | C2 | Y' | C1' | C2' | R' | B' | G' |
|---|---|---|---|---|---|---|---|---|---|---|---|
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 0.50 | 1.00 | 0.65 | 0.35 | -0.15 | 0.71 | 0.05 | -0.02 | 1.05 | 0.98 | 0.98 |
| 1.00 | 0.00 | 0.50 | 0.15 | 0.35 | -0.15 | 0.00 | 0.10 | -0.04 | 1.10 | 0.96 | 0.96 |
| 1.00 | 0.00 | 0.00 | 0.00 | 0.00 | 0.00 | 0.00 | 0.10 | -0.04 | 1.10 | 0.96 | 0.96 |
| 1.00 | 0.00 | 0.00 | 0.00 | 0.00 | 0.00 | 0.00 | 0.10 | -0.04 | 0.81 | 0.67 | 0.67 |
| 1.00 | 0.00 | 0.00 | 0.00 | 0.00 | 0.00 | 0.00 | 0.10 | -0.04 | 0.10 | -0.04 | -0.04 |
| | 0.00 | 0.00 | 0.00 | 0.00 | 0.00 | 0.00 | 0.10 | -0.04 | 0.10 | -0.04 | -0.04 |
| | 0.00 | 0.00 | 0.00 | 0.00 | 0.00 | 0.00 | 0.10 | -0.04 | 0.10 | -0.04 | -0.04 |
| | 0.00 | 0.00 | 0.00 | 0.00 | 0.00 | 0.00 | 0.05 | -0.02 | 0.05 | -0.02 | -0.02 |
| | 0.00 | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 | 0.00 |
| | 0.00 | 0.00 | 0.00 | 0.00 | 0.00 | 0.00 | 0.00 | 0.00 | 0.00 | 0.00 | 0.00 |

FIG.22

| IN | G&B | R | Y | C1 | C2 | Y' | G1' | C2' | R' | B' | G' |
|---|---|---|---|---|---|---|---|---|---|---|---|
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.00 | 0.00 | 1.00 | 1.00 | 1.00 |
| 1.00 | 1.00 | 1.00 | 1.00 | 0.00 | 0.00 | 1.00 | 0.05 | -0.02 | 1.05 | 0.98 | 0.98 |
| 1.00 | 1.00 | 1.00 | 1.00 | 0.00 | 0.00 | 1.00 | 0.10 | -0.04 | 1.10 | 0.96 | 0.96 |
| 1.00 | 1.00 | 1.00 | 1.00 | 0.00 | 0.00 | 1.00 | 0.10 | -0.04 | 1.10 | 0.96 | 0.96 |
| 1.00 | 1.00 | 1.00 | 0.65 | 0.35 | -0.15 | 0.69 | 0.10 | -0.04 | 0.79 | 0.65 | 0.65 |
| 1.00 | 0.50 | 0.50 | 0.15 | 0.35 | -0.15 | 0.00 | 0.10 | -0.04 | 0.10 | -0.04 | -0.04 |
| 1.00 | 0.00 | 0.00 | 0.00 | 0.00 | 0.00 | 0.00 | 0.10 | -0.04 | 0.10 | -0.04 | -0.04 |
| 1.00 | 0.00 | 0.00 | 0.00 | 0.00 | 0.00 | 0.00 | 0.10 | -0.04 | 0.10 | -0.04 | -0.04 |
| 1.00 | 0.00 | 0.00 | 0.00 | 0.00 | 0.00 | 0.00 | 0.05 | -0.02 | 0.05 | -0.02 | -0.02 |
| 1.00 | 0.00 | 0.00 | 0.00 | 0.00 | 0.00 | 0.00 | 0.00 | 0.00 | 0.00 | 0.00 | 0.00 |
| 1.00 | 0.00 | 0.00 | 0.00 | 0.00 | 0.00 | 0.00 | 0.00 | 0.00 | 0.00 | 0.00 | 0.00 |
| 1.00 | 0.00 | 0.00 | 0.00 | 0.00 | 0.00 | 0.00 | 0.00 | 0.00 | 0.00 | 0.00 | 0.00 |
| 1.00 | 0.00 | 0.00 | 0.00 | 0.00 | 0.00 | 0.00 | 0.00 | 0.00 | 0.00 | 0.00 | 0.00 |

IMAGE PROCESSING APPARATUS AND METHOD, AND MEDIUM CONTAINING IMAGE PROCESSING CONTROL PROGRAM

BACKGROUND OF THE INVENTION

1. Field of the Invention

The present invention relates to an image processing apparatus which performs image processing on image data obtained by utilizing a single-plate solid image pickup device, an image processing method and a medium where an image processing control program is stored.

2. Description of the Prior Art

A digital still camera or the like using a solid image pickup device usually employs a single-plate method. As shown in FIG. 23(a), in the single-plate method, color filters of R (red), G (green) and B (blue) are arranged in mosaic at predetermined ratios, in correspondence with respective pixels of the solid image pickup device. Especially, G color filters are zigzag arranged, in a high color component ratio. At each pixel of the solid image pickup device, color signals of the respective R, G and B colors cannot be obtained, but only one of R, G and B color signals is obtained. Accordingly, color signals that cannot be directly obtained at each pixel are obtained by interpolation from color signals of adjacent pixels, then all the R, G and B color signals are converted into multilevel data. The multilevel data are outputted, and display is made based on the multilevel data on a display device or the like.

For example, in FIG. 23(a), in the intermediate color filter array indicated by an arrow (→), the left half part from the center is irradiated with light (white part), while the right half part from the center is not irradiated with light (hatched part), as shown in FIG. 23(b). Assuming that the color signal level of respective colors in irradiated state is "1" and that of the same color signals in unirradiated state is "0", the levels of the R and G color signals will have values as shown in FIG. 23(c).

However, as described above, a G color signal cannot be directly obtained from an R color filter, and an R color signal cannot be directly obtained from a G color filter. Accordingly, the G color signal corresponding to the R color filter is obtained from linear interpolation on the G color signal at an adjacent pixel. On the other hand, the R color signal corresponding to the G color filter is obtained from linear interpolation on the R color signal at an adjacent pixel. Then, the G and R color signal levels have the values as shown in FIGS. 23(d) and 23(e). As it is apparent from these figures, false color signals occur at pixels around the boundary between an irradiated area and an unirradiated area, and a color blur occurs on an image by this false color signal. Especially, the color blur remarkably appears on the boundary between gray and white color areas. Conventionally, to reduce such color blur, a smoothing filter (low-pass filter) is applied to color difference data of all the pixels constituting image data so as to make the color blur inconspicuous.

The conventional technique has the following problem.

The application of the smoothing filter corresponds to diffusion of one color component of one pixel to peripheral pixels; that is, matrix calculation is performed by using, e.g., 5×5 pixel matrix having one pixel as the center. For example, in the 5×5 pixel matrix calculation, calculation is performed 5×5=25 times on one pixel. Accordingly, in case of calculation on all the pixels, the calculation amount is enormously 25×the number of pixels, which increases processing time.

SUMMARY OF THE INVENTION

The present invention has been made in consideration of the above problem, and has its object to provide an image processing apparatus which reduces processing time, upon reduction of color blur in image data obtained by a single-plate solid image pickup device, an image processing method, and a medium where an image processing control program is stored.

The foregoing object of the present invention is attained by providing an image processing apparatus which performs image processing on image data consisting of dot-matrixed pixels, generated by obtaining image data by a single-plate solid image pickup device where a plurality of color filters of element color components are arranged in mosaic in a nonuniform densities and supplementing the image data by calculation to change the nonuniform densities to uniform densities, the apparatus comprising: a color-blur pixel detection unit which detects a color blur pixel in the image data; and an image processing unit which performs image processing on pixels within a predetermined range having the detected color blur pixel as a reference pixel, so as to reduce a color blur.

The present invention is constructed as above on the premise that image data as an image processing object consists of dot-matrixed pixels obtained by a singe-plate solid image pickup device. In the single-plate solid image pickup device, as color filters of a plurality of element colors are arranged in mosaic in nonuniform densities, the element colors are supplemented by calculation so as to obtain uniform densities. However, as described above, a false color component is generated upon calculation and a color blur occurs. The color-blur pixel detection unit detects a color blur pixel where such color blur occurs, and the image processing unit performs image processing on pixels within a predetermined range having the detected color blur pixel as a reference, to reduce the color blur.

According to the present invention, in image data obtained by a single-plate solid image pickup device, a color blur pixel is detected, and the color blur is reduced with respect to pixels within a predetermined range having the detected pixel as a reference. Accordingly, an image processing apparatus which reduces the amount of calculation and reduces processing time can be provided.

When existence/absence of color blur is detected with respect to a pixel, as the existence/absence of color blur cannot be uniformly detected from each of element color components of the pixel, the existence/absence of color blur is detected from comparison between the pixel and peripheral pixels. Further, as the color filters for the respective element colors are arranged in nonuniform densities in the solid image pickup device, the color blur due to the above-described false element color component easily occurs with respect to an element color component of a low-density color filter. Accordingly, it may be arranged such that the color-blur pixel detection unit detects the color blur pixel based on the change rate of element color intensity of a low-density color filter between a detection object pixel and a pixel adjacent to the object pixel.

Accordingly, the color blur pixel can be easily detected by only examining the element color intensity for the low-density color filter.

As an example of a particular method for detecting a color blur pixel, the color-blur pixel detection unit may detect the color blur pixel based on the change rate of difference between a reference element color intensity and the element color intensity for the low-density color filter, between adjacent pixels.

In this arrangement, the calculation for color-blur pixel detection can be easily performed only by examining the change rate of the difference between the reference element color intensity and the element color intensity for the low-density color filter.

For example, as in the intermediate color-filter array in FIG. 23(a), if the alternate arrangement of the R and G color filters is known in advance, as the R filters are low-density color filters, G color is employed as a reference element color component, and the change rate of the difference $\Delta RG = |R-G|$ between the reference color component G and the low-density filter color R is examined between adjacent pixels. The value of the difference $\Delta RG$ is as shown in FIG. 23(f). In the change rate of $\Delta RG$ between the adjacent pixels, a pixel around the border between the irradiated area and unirradiated area has a value "0.5". The pixel having the value "0.5" is detected as the color blur pixel.

The method for detecting a color blur pixel based on the change rate of the difference between element color intensities is not limited to the above-described method. If there are a plurality of low-density color filters, the above-described color-blur pixel detection unit may obtain the difference between the element color intensities of the low-density color filters, and detect a color blur pixel based on the change rate of the difference between adjacent pixels.

That is, as described above, as a false element color component remarkably appears in an element color for a low-density color filter, the difference between the element color intensities for low-density color filters is examined. For example, as shown in FIG. 23(a), if the density of the G color filters is high and the densities of the R and B color filters are low with respect to the entire color filter, a false element color component remarkably appears in R and G colors. In the intermediate color filter array, if the B color signal levels at the respective pixels are linear-interpolated from the adjacent B color filters in the upper color filter array, the B color signal levels at the respective pixels in the intermediate color filter array are as shown in FIG. 23(d). As the difference between the R and B color signal levels, $\Delta RB = |R-B| = \Delta RG$ holds. Accordingly, the values of the $\Delta RB$ between the adjacent pixels are as shown in FIG. 23(f), and the change rate of the difference $\Delta RB$ at the pixels around the border between the irradiated area and the unirradiated area is "0.5". These pixels are detected as the color blur pixels.

In this manner, if there are a plurality of low-density color filters, the calculation for color blur pixel detection can be easily made only by uniformly examining the change rate of the difference between component color intensities for low-density color filters.

Whether to examine the difference between a reference element color intensity and a low-density element color intensity or to examine the change rate of the difference between low-density element color intensities, various aspects can be provided to examine the change rate between any of adjacent pixels. For example, the change rate may be examined between adjacent pixels in eight horizontal, vertical and diagonal directions. If the number of directions of comparison is appropriately reduced, the amount of calculation can be reduced. For the above-described reason, a false element color component occurs at a pixel for a low-density color filter with a high probability, therefore, the change rate should preferably be examined between adjacent pixels corresponding to low-density color filters. It may be arranged such that the color-blur pixel detection unit detects a color blur pixel by examining the change rate between adjacent pixels corresponding to low-density color filters.

By this arrangement, as the above-described change rate of the difference is examined between pixels corresponding to low-density color filters, the detection can be performed with higher reliability.

On the other hand, the image processing to reduce a color blur can be realized by using a predetermined sized smoothing filter, with a detected color blur pixel as a reference. As a preferred example of the smoothing processing, the image processing performs smoothing processing on color difference components obtained by subtracting luminance components from element color components of pixels within a predetermined range having a detected color blur pixel as a reference, and returns the processed components to the original element color components.

That is, the image processing unit performs smoothing processing on pixels within a predetermined range having a detected color blur pixel as a reference. As smoothing on color difference component is effective to reduce the color blur, the color difference component, obtained by subtracting luminance component from the element color component of each pixel, is smoothing-processed, and returned to the original element color component.

In this manner, when a color blur is reduced by smoothing processing, as the color difference component is smoothing-processed and returned to the initial element color component, the calculation can be easily performed.

Further, as the sharpness of an image might be lost by the smoothing processing, it may be arranged such that the image processing unit performs edge enhancement processing so as to compensate for the sharpness lost by the smoothing processing.

In this manner, the edge enhancement processing can compensate for the lowering of the image sharpness due to the smoothing processing.

In execution of edge enhancement processing, if an area where the above-described smoothing processing is not performed is edge-enhanced, the outside of the smoothing processed area may be unnaturally edge enhanced. Accordingly, the image processing unit may perform edge enhancement processing on pixels within a smoothing processing range where the image sharpness may be lost.

In this manner, as the edge enhancement processing is performed on the pixels within the smoothing processing range, unnaturally-increased sharpness at pixels outside of the smoothing-processing range can be prevented.

Upon execution of smoothing processing, it is not advantageous to perform the smoothing processing, uniformly by the same range, on the entire image data. For example, if smoothing processing is performed, by the same range, on image data of a large image size and on image data of a small image size, as the ratio of the smoothing range with respect to the former image data and that with respect to the latter image data are different, even though desirable result is obtained from the former processing, the entire image may be too vague in the latter processing. Accordingly, according to the present invention, it may be arranged such that upon execution of smoothing processing with respect to pixels within the predetermined range having the detected color blur pixel as a reference, if the size of the image to be processed is large, the image processing unit enlarges the smoothing processing range, while if the image size is small, reduces the smoothing processing range.

In this case, the image processing unit detects the size of image data as the object of image processing in advance, then if the size of the image data is large, the image processing unit enlarges the smoothing processing range, while if the size of the image data is small, the image processing unit reduces the smoothing processing range. More specifically, the above operation of the image processing unit can be realized by storing a plurality of smoothing filters of different sizes and selecting one of the filters in accordance with the image size.

Accordingly, as the smoothing processing range can be changed in accordance with the size of image to be processed, smoothing processing can be performed with an optimum range.

Further, as one example of reduction of color blur, the image processing unit detects color difference components obtained by subtracting luminance components from element color components of pixels within a predetermined range having a detected color blur pixel as a reference, then replaces the color difference component having a central value with the color difference component of the color blur pixel, and returns the color difference components to the original element color components. That is, the color blur is reduced by replacing the color difference component of the color blur pixel with that of a peripheral pixel. Note that a particular construction to select a central value in color difference components of pixels within a predetermined range may be realized by a predetermined median filter or the like.

In this manner, the central value of color difference components of pixels within a predetermined range is used as a color blur pixel, thus the color blur is reduced.

As described above, the smoothing processing is performed on pixels within a predetermined range having a color blur pixel as a reference, then the subsequent edge enhancement processing compensates for sharpness lost by the smoothing. However, empirically, if color blur pixels exist on an edge portion as a border of an image, the image of the edge portion may become vague. In view of this inconvenience, it may be arranged such that the image processing unit determines whether or not the color blur pixel is an edge pixel. If the color blur pixel is an edge pixel, the image processing unit replaces the color difference component having the central value, among color difference components, obtained by subtracting luminance components from element color components of pixels within a predetermined range having the color blur pixel as a reference, with the color difference component of the color blur pixel. On the other hand, if the color blur pixel is not an edge pixel, the image processing unit performs smoothing processing on the color difference components, obtained by subtraction of luminance components from element color components of pixels within the predetermined range having the color blur pixel as a reference, and returns the color difference components to the initial element color components.

In this case, if a color blur pixel is detected, the image processing unit determines whether or not the color blur pixel is an edge pixel. If the image processing unit determines that the color blur pixel is an edge pixel, the image processing unit detects color difference components of pixels within a predetermined range having the color blur pixel as a reference, then replaces the color difference component having the central value with the color difference component of the color blur pixel, and returns the color difference components to the initial element color components, as described above. On the other hand, if the image processing unit determines that the color blur pixel is not an edge pixel, performs smoothing processing on the color difference components of pixels within the predetermined range having the color blur pixel as a reference, and returns the color difference components to the initial element color components.

For example, if a color blur pixel exists on the border between white and black areas, the color difference component of the color blur pixel is replaced with the color difference component of a peripheral pixel, i.e., the color blur pixel becomes a pure white or black pixel, which removes the color blur while prevents vagueness of the border portion. Further, when it is determined whether or not a color blur pixel is an edge pixel, the determination can be made, e.g., by comparing the change rate of the color difference component with a predetermined threshold value, since the change rate of color difference component between adjacent pixels increases at edge pixels. If the change rate of the color difference component is larger than the threshold value, it is determined that the color blur pixel is an edge pixel. It may be arranged such that an edge pixel is determined based on the change rate of luminance component between adjacent pixels, on the assumption that the edge pixel has a steep luminance slope.

In this manner, if the color blur pixel is an edge pixel, the color difference component having the central value within the predetermined pixel range is applied to the color blur pixel, while if the color blur pixel is not an edge pixel, smoothing processing is performed. As a result of processing, the image edge portion is not vague.

The method to detect color blur pixel and reduce the color blur with respect to pixels within a predetermined range having the color blur pixel as a reference is not necessarily realized by a substantial apparatus, but is also effectively realized by a method.

As described above, the image processing apparatus which detects a color blur pixel and reduces a color blur with respect to pixels within a predetermined range having the color blur pixel as a reference may be a single device or may be installed into another apparatus. Thus, the present invention may be utilized in various aspects. Further, the present invention can be appropriately changed; for example, it can be realized by hardware or software.

In a case where the idea of the present invention is embodied as software to control an image processing apparatus, the idea of the present invention exists, and can be utilized on a storage medium containing the software. The storage medium may be a magnetic storage medium or opto-magnetic storage medium, or any storage medium developed in the future; further, duplications from such storage medium such as a primary duplicate, a secondary duplicate and the like must be equivalent to the initial storage medium. Furthermore, even if a communication line is used as unit for supplying the present invention, or even if the method of the present invention is written into a semiconductor chip, the present invention can be utilized.

Further, the idea of the present invention does not change even if it is realized partially by software and partially by hardware, and further, partially stored on a storage medium and appropriately read out from the storage medium in accordance with necessity.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7(a) and 7(b) are schematic diagrams showing the relation between an image size and a smoothing area;

FIGS. 8(a) to 8(c) are diagrams showing 3×3, 5×5 and 7×7 pixel smoothing filters;

FIGS. 9(a) and 9(b) are diagrams showing the relation between height and width of image data of the same number of pixels;

FIG. 11 is an explanatory view showing a case where the change rate of element color component is obtained from a difference value between diagonally adjacent pixels;

FIG. 12 is an explanatory view showing a case where the change rate of an image is obtained from a difference value between diagonally adjacent pixels;

FIG. 13 is an explanatory view showing a case where the change rate of an image is obtained between all the adjacent pixels;

FIG. 14 is an explanatory view showing a modification of the case where the change rate of the image is obtained between adjacent pixels;

FIG. 15 is an explanatory view showing another modification of the case where the change rate of the image is obtained between adjacent pixels;

FIGS. 18(a) to 18(c) are diagrams showing 3×3, 5×5 and 7×7 pixel unsharp masks;

FIG. 20 is a table showing various parameter values in a one-dimensional simulation model in a case where edge enhancement processing is not performed;

FIG. 21 is a table showing various parameter values in the one-dimensional simulation model in a case where edge enhancement processing is performed by using an unsharp mask of the same size as that of a smoothing filter;

FIG. 22 is a table showing various parameter values in the one-dimensional simulation model in a case where edge enhancement processing is performed by using an unsharp mask of a size smaller than that of the smoothing filter.

DETAILED DESCRIPTION OF THE PREFERRED EMBODIMENTS

A referred embodiment of the present invention will now be described in detail in accordance with the accompanying drawings.

Figure 1:
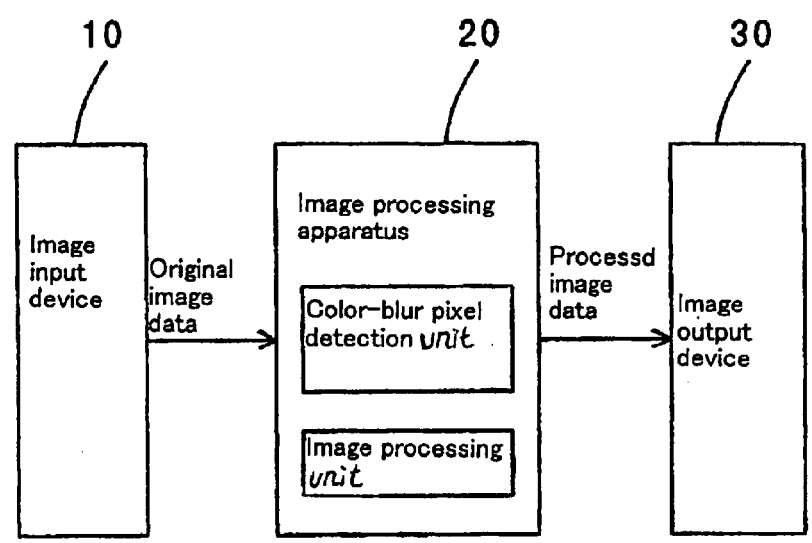
FIG. 1 is a block diagram showing an image processing system to which an image processing apparatus according to an embodiment of the present invention is applied.
Figure 2:
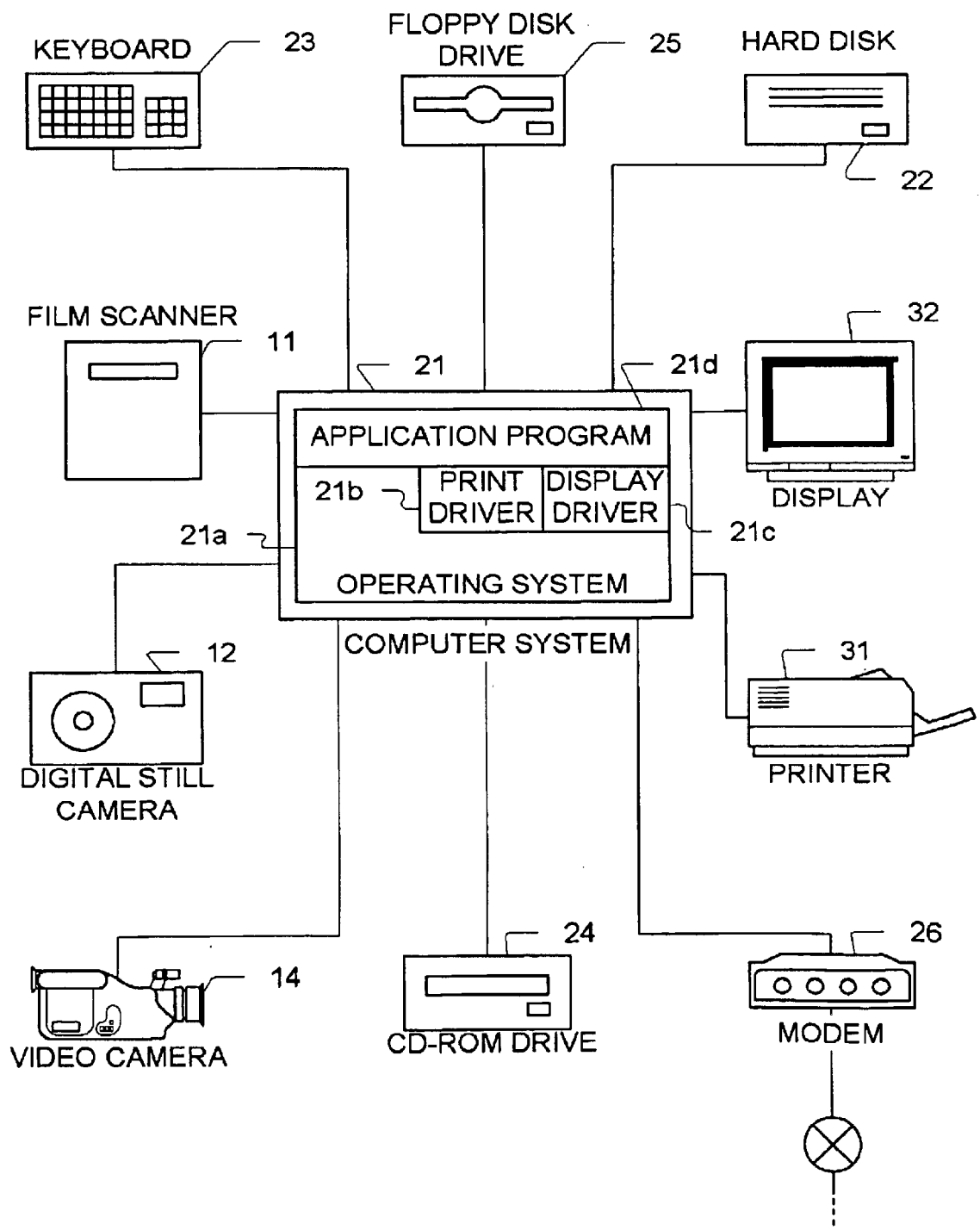
FIG. 2 is a block diagram showing a hardware construction of the image processing apparatus.

FIG. 1 is a block diagram showing an image processing system to which an image processing apparatus according to an embodiment of the present invention is applied. FIG. 2 is a block diagram showing a particular hardware construction of the apparatus.

In FIG. 1, an image input device 10 outputs an image obtained by utilizing a single-plate CCD or the like, as image data represented by dot-matrixed pixels, to an image processing apparatus 20. By the above-described principle, the image data obtained by the single-plate CCD includes a color blur. The image processing apparatus 20 detects a color blur pixel in the input image data, then performs image processing within a predetermined range having the color blur pixel as a reference so as to reduce the color blur, and outputs the processed data to an image output device 30. The image output device 30 outputs the image processed data in dot-matrixed pixels.

The image processing apparatus 20 comprises color-blur pixel detection unit for detecting a color blur pixel, and image processing unit for performing image processing to reduce the color blur with the detected color blur pixel as a reference.

Figure 3:
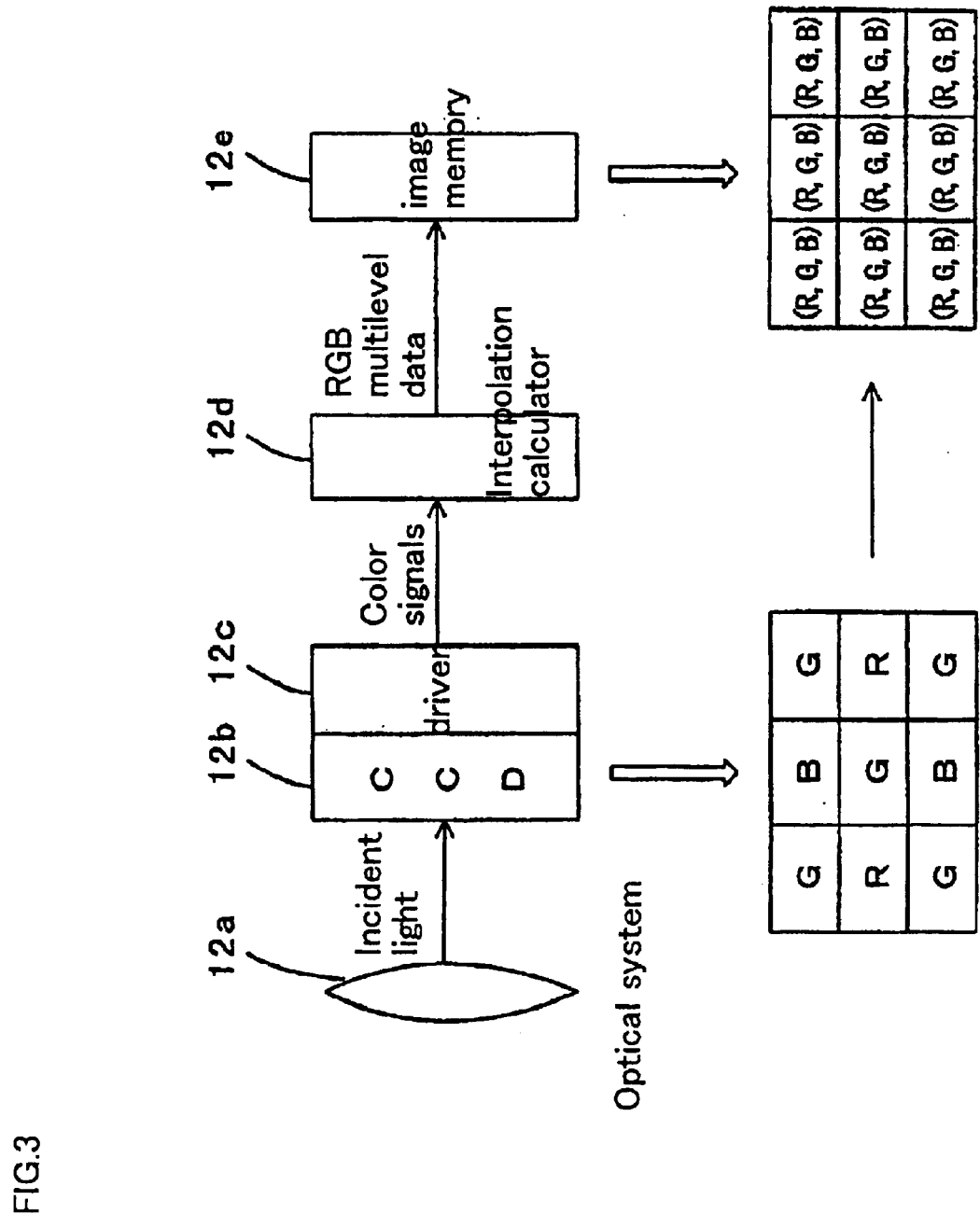
FIG. 3 is a block diagram showing a simple hardware construction of a digital still camera.

The image input device 10 is realized by, e.g., in FIG. 2, a film scanner 11 a digital still camera 12 or a video camera 14 having a single-plate CCD. For example, FIG. 3 is a schematic diagram showing a schematic hardware construction of the digital still camera 12. In FIG. 3, incident light passes through an optical system 12a and enters a CCD 12b. The CCD 12b has R, G and B color filters arranged at predetermined ratios in correspondence with the respective pixels. A driver 12c outputs color signals at each pixel. The output color signals are digital-converted and inputted into an interpolation calculator 12d. The interpolation calculator 12d obtains a color signal of an element color component, which cannot be directly obtained with respect to a pixel, by linear interpolation calculation from a peripheral pixel. The color signals including the signal obtained by the linear interpolation are stored as RGB multilevel data into an image memory 12e.

On the other hand, the image processing apparatus 20 is realized by, e.g., a computer system comprising a computer 21, a hard disk 22, a keyboard 23, a CD-ROM drive 24, a floppy disk drive 25 and a modem 26. The image output device 30 is realized by, e.g., a printer 31 or a display 32. Note that the modem 26 is connected to a public communication line, and connected to an external network via the public communication line, to download and introduce software and data.

In the present embodiment, the film scanner 11 or the digital still camera 12 as the image input device 10 outputs RGB multilevel data as image data, and the printer 31 as the image output device 30 inputs CMY (cyan, magenta, yellow) or CMYK (CMY+black (K)) binary data, while the display 32 inputs RGB multilevel data.

On the other hand, an operating system 21a operates in the computer 21, and a printer driver 21b and a display driver 21c corresponding to the printer 31 and the display 32 are installed in the computer 21. Further, an image processing application program 21d performs processing under the control of the operating system 21a. The image processing application program 21d performs predetermined image processing in cooperation with the printer driver 21b and the display driver 21c, in accordance with necessity. Accordingly, the computer 21 as the image processing apparatus particularly plays roles to input RGB multilevel data, generate RGB multilevel data where image processing has been performed to detect a color blur pixel and reduce the color blur, display the data on the display 32 via the display driver 21c, and at the same time, convert the data into CMY (or CMYK) binary data via the printer driver 21b, and cause the printer 31 to print-output the converted data.

Figure 4:
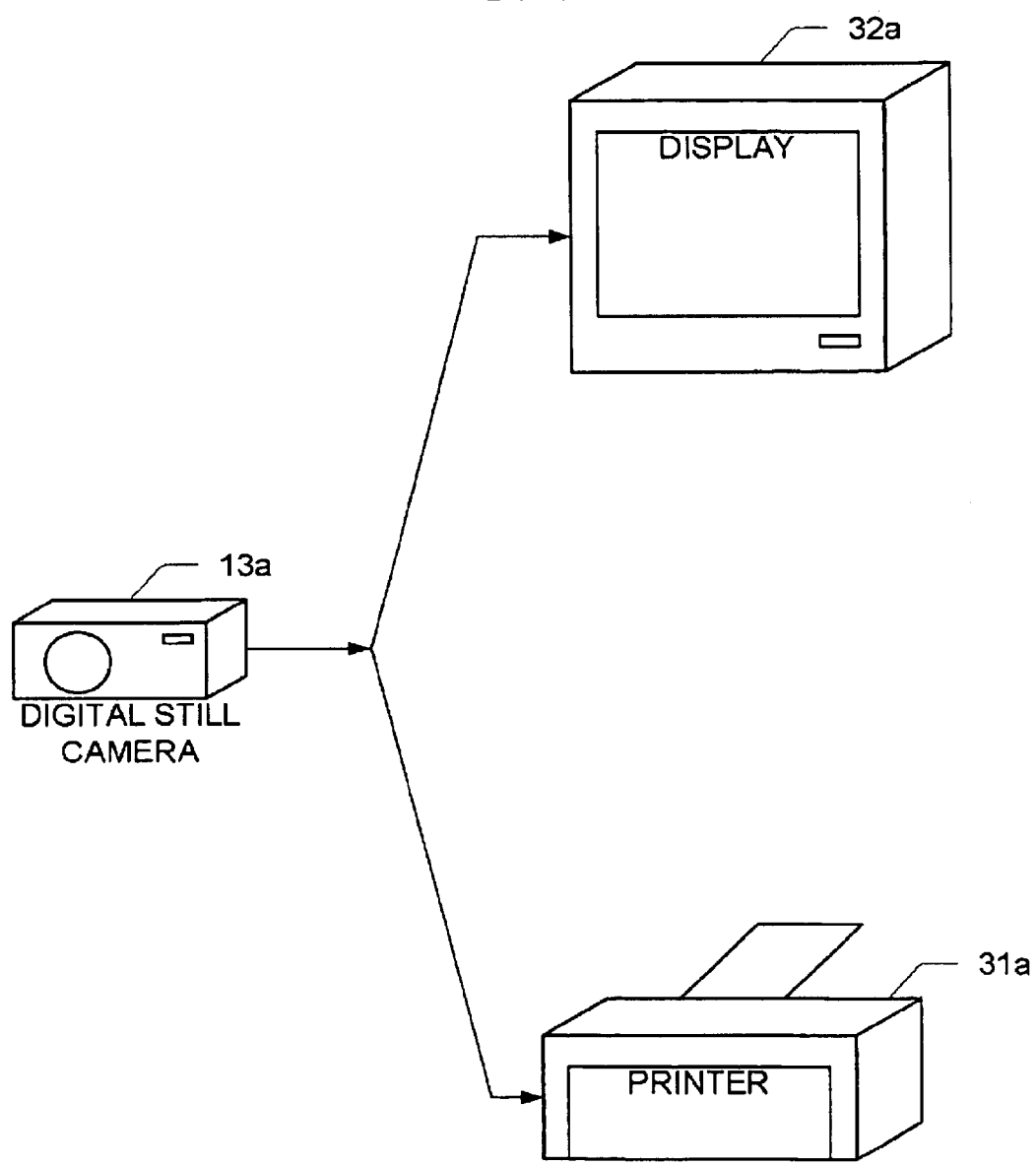
FIG. 4 is a schematic diagram showing another application example of the image processing apparatus of the present invention.
Figure 5:
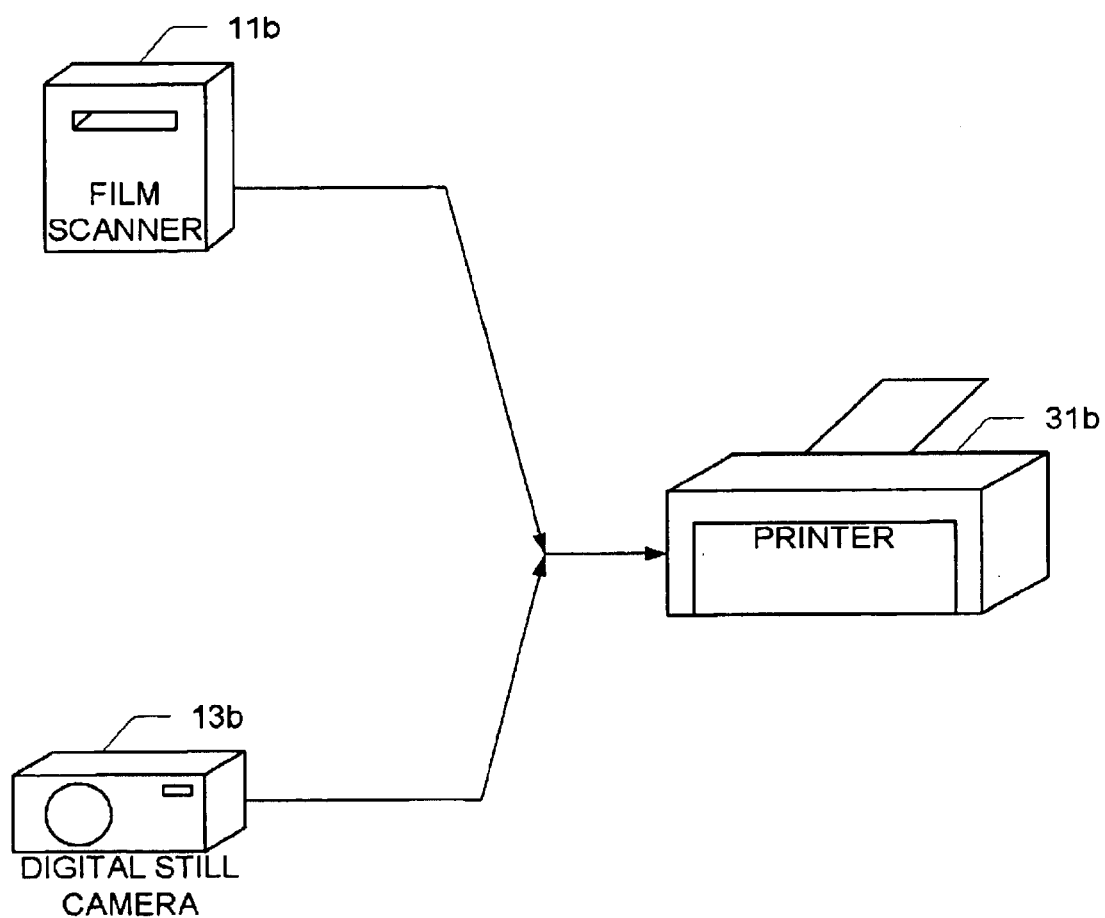
FIG. 5 is a schematic diagram showing another application example of the image processing apparatus of the present invention.

Thus, in the present embodiment, a computer system for image processing is installed between the image input and output devices, however, such computer system is not necessarily provided. The present invention is applicable to a system to perform image processing to reduce a color blur with respect to image data including the color blur, resulted from image-pickup by a single-plate CCD and interpolation calculation as described above. For example, as shown in FIG. 4, the present invention may be applied to a system where an image processing apparatus to perform image processing is installed into a digital still camera 13a having a single-plate CCD. A display 32a performs display or a printer 31a performs printing by using image data where a color blur is reduced. Further, as shown in FIG. 5, the system may be constructed such that a printer 31b which inputs image data without computer system and perform printing, performs image processing to image data, inputted via a film scanner 11b or a digital still camera 13b having a single-plate CCD, to reduce a color blur.

Figure 6:
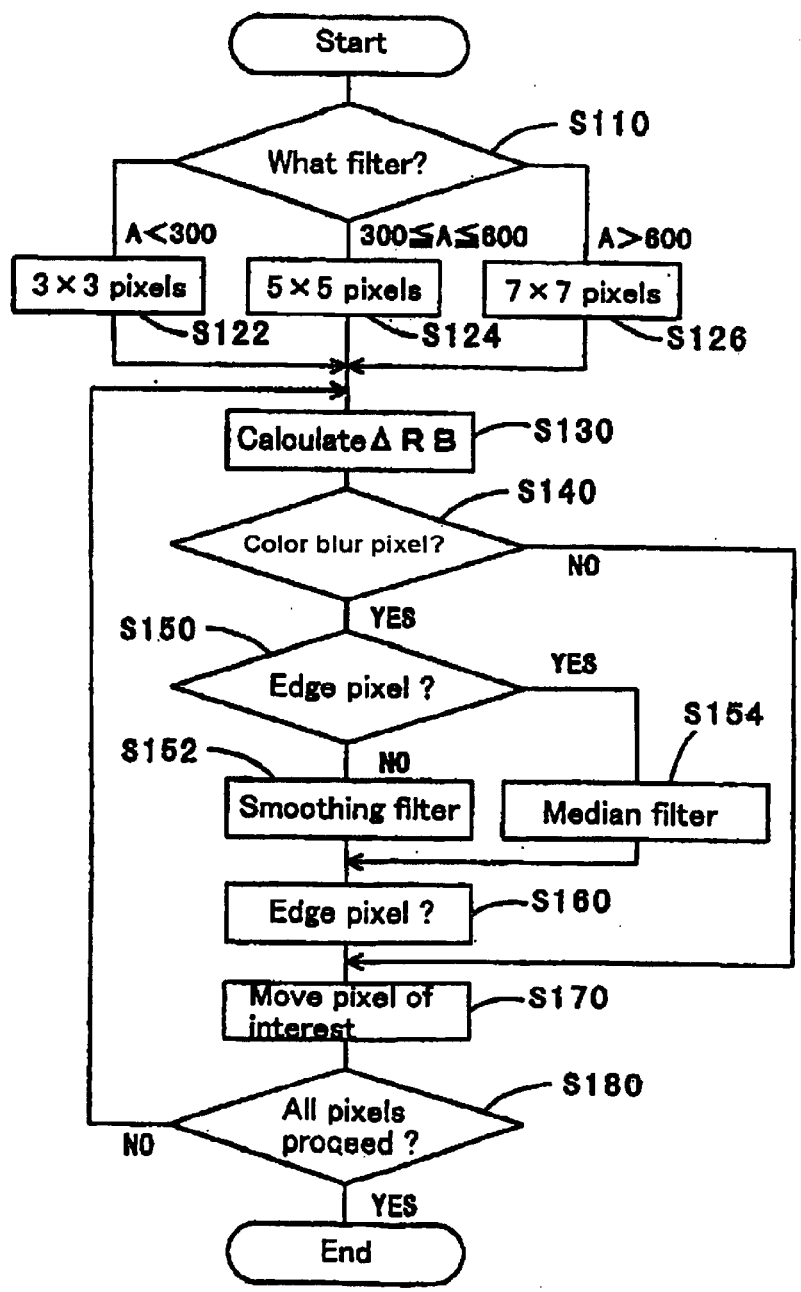
FIG. 6 is a flowchart showing determination of color blur pixel and image processing by the image processing apparatus of the present invention.

The above-described image processing to detect a color blur pixel and to reduce a color blur is executed by an image processing program, corresponding to a flowchart of FIG. 6, in the above computer 21.

The method for reducing a color blur employed in the present embodiment uses a smoothing filter as described later, similarly to the conventional method, however, it is different from the conventional method in that the range where the smoothing filter is used is limited to periphery of a color blur pixel. For example, smoothing processing on two image sizes of bit maps as image data to be processed, as shown in FIGS. 7(a) and 7(b), is considered. The image data are processed with smoothing filters of the same size, as represented by hatched portions in the figures. Note that if each pixel of the image data one-to-one corresponds to each pixel of a CCD, the image size differs in accordance with the number of pixels of the CCD; further, even if the number of pixels of the CCDs are the same, the image size is appropriately enlarged/reduced. The image data in this case have different sizes from these reasons.

As apparent from these figures, as long as smoothing filters of the same size are used, the ratio of the smoothing process area with respect to the entire image changes as the image size changes. Accordingly, if smoothing filters uniformly of the same size are applied to image data of various image sizes, an appropriate sized area may be smoothed, as shown in FIG. 7(a), while sometimes the ratio of the smoothing process area with respect to the entire image may be large, as shown in FIG. 7(b). Since smoothing processing is blurring an image, there is a possibility that almost whole image is blurred as shown in FIG. 7(b).

Accordingly, the present embodiment employs smoothing filters of different sizes of, e.g., 3×3, 5×5 and 7×7, as shown in FIGS. 8(a) to 8(c), and appropriately selects the smoothing filter in accordance with an image size. Upon determination of the size of a bitmap image, (height)×(width) of the image may be calculated to obtain the number of pixels, and the obtained number of pixels may be used as an index. However, in the present embodiment, the image size of a processing object image is determined in accordance with A represented by the following equation:

$$A = \min(\text{height}, \text{width}) \quad (1)$$

Note that min(height, width) means smaller one of the height and the width. At step S110, if A<300 holds,
the 3×3 pixel smoothing filter is selected;
if 300≦A≦600 holds,
the 5×5 pixel smoothing filter is selected; and
if A>600 holds,
the 7×7 pixel smoothing filter is selected.

The types of smoothing filters used at steps S122 to S126 are stored into a work area. The work area may be a RAM in the computer 21 or the hard disk 22.

The min(height, width) is used as a reference from the following reason. That is, whether or not the size of a smoothing filter is appropriate may be determined based on the ratio of the number of smoothed pixels with respect to the number of all the pixels. However, there are various image data, even having the same number of pixels, such as image data having a width longer than its length, as shown in FIG. 9(a), and a typical rectangular image data having a width a little longer than its length as shown in FIG. 9(b). In a case where a smoothing filter is determined in accordance with the number of pixels of processing object image, the same smoothing filter is selected for both image data in FIGS. 9(a) and 9(b). Then, the former image is smoothed almost over the whole length in height, although the latter image is smoothed with an appropriate smoothing filter. In this case, the former image provides visually blurred impression. Accordingly, this inconvenience can be avoided by using smaller one of the "height" and "width" of image as a reference.

Figure 10:
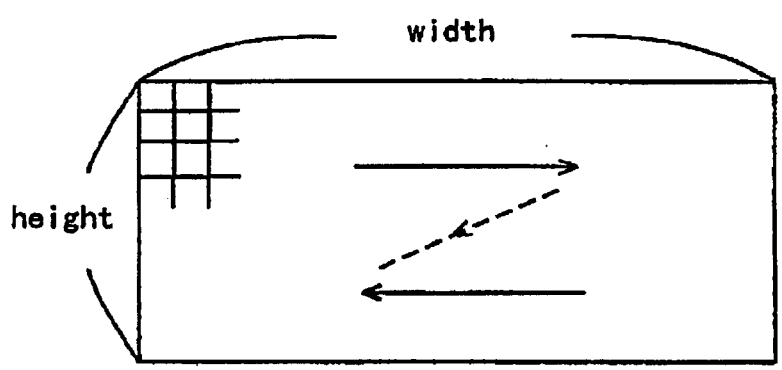
FIG. 10 is an explanatory view showing the movement of a pixel of interest in processing.

Referring to the flowchart of FIG. 6, in image data comprising dot-matrixed pixels as shown in FIG. 10, it is determined with respect to each pixel whether or not the pixel is a color blur pixel, while the pixel of interest is horizontally moved in a main-scanning direction, and moved in a subscanning direction.

If the image data comprises dot-matrixed pixels, each pixel is represented by RGB multilevel data ("0" to "255" level). The types of the smoothing filters to be used are stored at steps S122 to S126, then, at step S130, the difference ΔRB of R and B multilevel data at a pixel of interest and its peripheral pixel. The difference ΔRB is represented as:

$$\Delta RB = |R - B| \quad (2)$$

Figure 23:
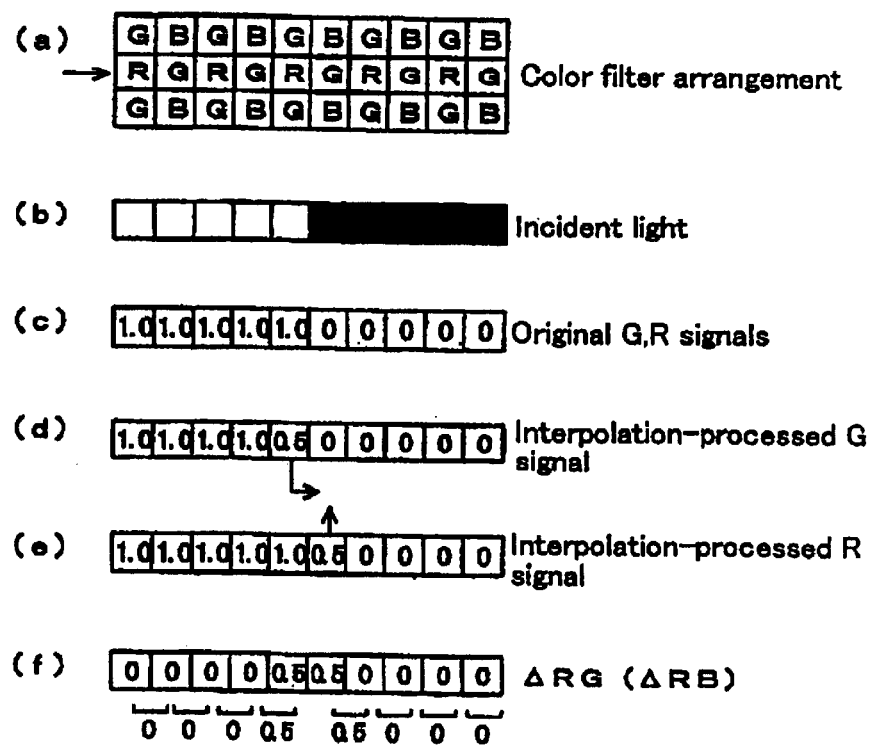
FIGS. 23(a) to 23(f) are explanatory views showing the principle of occurrence of color blur.

As shown in FIG. 23(a), the CCD of the present embodiment has an arrangement where the R, G and B color filters are arranged in mosaic in correspondence with respective pixels, and only the G color filters are zigzag arranged in a high density, while the R and B color filters are arranged in low densities. At a pixel, a color signal which cannot be directly obtained is obtained by linear interpolation calculation from a color signal of an adjacent pixel, then the obtained the R, G and B color signals are converted into multilevel data. Accordingly, as a result of linear interpolation calculation, at some pixel, lack of initial intensity in low-density R, B multilevel data, or generation of false element color component which has not been initially unnecessary, causes a color blur, at a certain probability.

Further, it is known that a color blur remarkably appears around the border especially between white and black areas. For example, when white color is represented at a pixel corresponding to an R color filter, the RGB multilevel data is initially (R, G, B)=(255, 255, 255), however, linear interpolation calculation may result in, e.g., multilevel data (R, G, B)=(255, 255, 127). As the G color filters are arranged in a high density, there is a low probability that a false G color component occurs from interpolation calculation; the R component, that can be usually directly obtained from the G color filter, does not include a false color component. Initially, to represent white at a pixel, the value of the difference ΔRB is "0", and to represent black, the value of the difference ΔRB is also "0". However, at a color blur pixel, the value of the difference ΔRB tends to be greater than "0".

In some image data, a pixel where the R and G components have high intensities while the B component has a low intensity exists. However, in this case, the respective element color components are maintained at its adjacent pixel, and the ΔRB value gradually changes as it becomes distant from the initial pixel. On the other hand, as a color blur basically occurs in pixel units, and one of adjacent pixels is white or black or the like, it cannot be wrong to regard a pixel having a high ΔRB change rate between adjacent pixels as a color blur pixel. Accordingly, in the present embodiment, the change rate of the ΔRB value between a pixel of interest and its peripheral pixel is examined as described later, and a pixel having a high change rate is detected as a color blur pixel. As there is a low probability that the G color filters, arranged in a high density, cause a false element color component by interpolation calculation, the equation (2) may be replaced with the following equations, using this element color component as a reference;

$$\Delta GR = |G-R| \quad (3)$$

$$\Delta GB = |G-B| \quad (4)$$

Further, the examination of the ΔRB change rate can be preferably made by comparing the ΔRB change rate between pixels corresponding to high-density color filters. That is, as a false element color component frequently occurs at a pixel corresponding to a low density color filter in comparison with a pixel corresponding to a high density color filter, the comparison of the ΔRB change rate between pixels corresponding to low density color filters enables detection with higher reliability.

Figure 11:
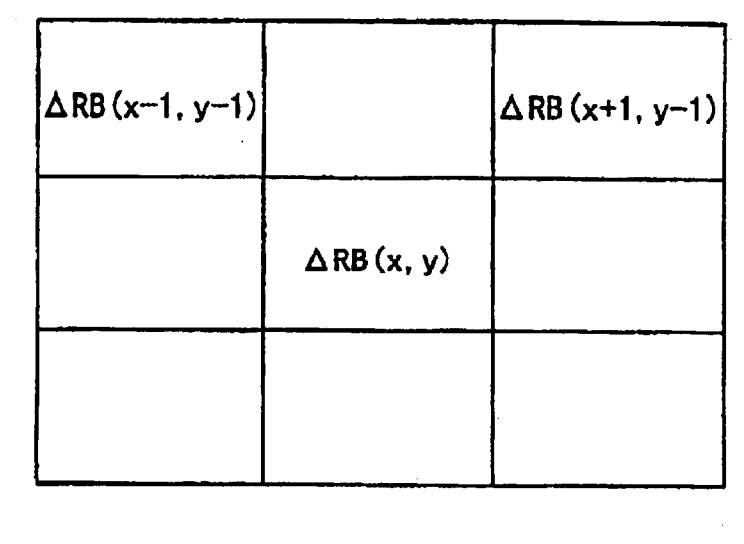

Actual color-blur pixel detection is performed at step S140, where it is determined whether or not a pixel of interest is a color blur pixel based on the change rate of the difference ΔRB, obtained as above, between peripheral pixels. At this time, as shown in FIG. 11, a matrix having x pixels in a horizontal direction and y pixels in a vertical direction is considered with the pixel of interest as a central pixel.

$$E = 4\Delta RB(x, y) - 2\Delta RB(x-1, y-1) - 2\Delta RB(x+1, y-1) \quad (5)$$

Then, the value of E and a predetermined threshold value Th is compared. If $E \geq Th$ holds, it is determined that the pixel of interest is a color blur pixel. Accordingly, at the above-described step S130, the difference ΔRB at the pixel of interest is obtained, and ΔRB(x−1, y−1) and ΔRB(x+1, y−1) are obtained as ΔRB values of peripheral pixels.

The meaning of the detection of the color blur pixel in accordance with the determination reference $E \geq Th$ is as follows. That is, if a color blur has occurred at a pixel of interest, as the ΔRB value change rate between the pixel of interest and its peripheral pixel becomes high, the value E in the equation (5) is large. If the value E exceeds the threshold value Th, it is determined that the pixel of interest is a color blur pixel. Further, referring to the equation (5) and FIG. 11, the ΔRB value change rate is examined between the pixel of interest and its diagonally adjacent pixel. Referring to FIG. 23(a), if the pixel of interest corresponds to R, the orthogonally adjacent pixel, to B; If the pixel of interest corresponds to B, the orthogonally adjacent pixel, to R; if the pixel of interest corresponds to G, the orthogonally adjacent pixel, to G. That is, if the pixel of interest corresponds to a low-density element color component, the change rate of the ΔRB value is examined between the pixel of interest and an adjacent pixel corresponding to a low-density element color component, while if the pixel of interest corresponds to a high-density element color component, the change rate of the ΔRB value is examined between the pixel of interest and an adjacent pixel corresponding to a high-density element color component.

Accordingly, at steps S130 and S140, the color-blur pixel detection is made based on the change rate of the difference between element color intensities corresponding to low-density color filters. Color-blur pixel detection unit is constructed by hardware and software to execute the above detection.

If it is determined at step S140 that the pixel of interest is a color blur pixel, it is determined whether or not the pixel is an edge pixel at step S150. As the determination of edge pixel is effectively made based on color difference component, color difference components C1 and C2 are obtained by subtracting a luminance component Y from R and B multilevel data, in the present embodiment. The color difference components C1 and C2 are represented as:

$$C1 = R - Y \quad (6)$$

$$C2 = B - Y \quad (7)$$

As RGB multilevel data do not directly have luminance values, to obtain the luminance, the RGB multilevel data may be color-converted to Luv color space. However, this is not advantageous due to the problem of the amount of calculation. For this reason, the following conversion to obtain luminance from RGB, utilized in television, is employed.

$$Y = 0.30R + 0.59G + 0.11B \quad (8)$$

As an edge pixel is a part of border portion of an image, the change rate of the color difference components C1 and C2 are high between adjacent pixels. If any one of the following two determination references is satisfied, a pixel of interest is determined to be an edge pixel.

$$|C1(x, y) - C1(x-1, y-1)| \geq Th1 \quad (9)$$

$$|C2(x, y) - C2(x-1, y-1)| \geq Th2 \quad (10)$$

Note that "x" represents a horizontal coordinate, and "y", a vertical coordinate.

Figure 12:
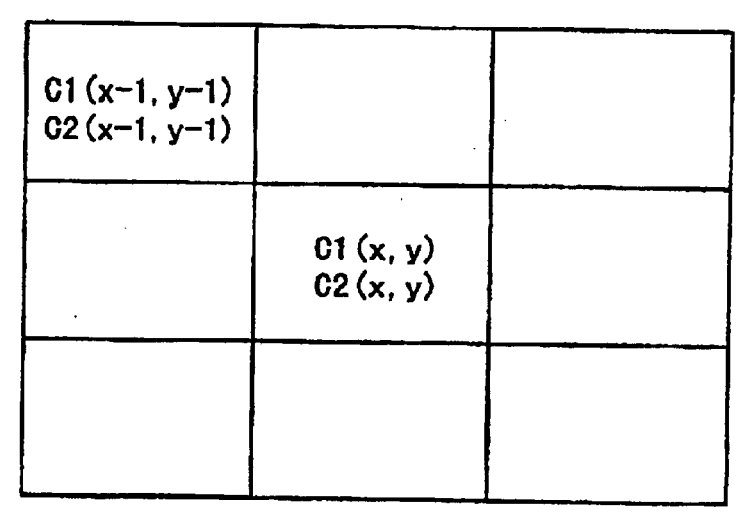

That is, the expressions (9) and (10) mean that, in image data consisting of dot-matrixed pixels having a color blur pixel as a central pixel as shown in FIG. 12, the change rates of the color difference components C1 and C2 are obtained between orthogonally adjacent pixels, and it is respectively determined whether or not the color difference components are greater than the threshold values Th1 and Th2. If one of the determination references is satisfied, the pixel of interest is determined to be an edge pixel. As the pixels are arranged in matrix as shown in FIG. 13, and when the central pixel is treated as a pixel of interest, there are eight adjacent pixels. Similarly, the change rates of the color difference components C1 and C2 obtained between adjacent pixels, and compared with threshold values Th1 and Th2. If the color difference components C1 or C2 is equal to or greater than the threshold value Th1 or Th2, it may be determined that the pixel of interest is a color blur pixel.

In this manner, the determination as to whether or not the color blur pixel is an edge pixel is effectively made based on the change rates of the color difference components C1 and C2. However, for one color blur pixel, comparison using the color difference components C1 and C2 are respectively performed with respect to eight adjacent pixels, the amount of calculation is too large, which might lower the processing speed. Accordingly, the comparison calculation may be performed with respect to four pixels in vertical and horizontal directions as shown in FIG. 14, or the comparison calculation may be performed with respect to diagonally adjacent four pixels as shown in FIG. 15. These methods reduces the amount of calculation.

Further, the determination as to whether the color blur pixel is an edge pixel may be made based on the slope of luminance. In this case, the above-described expressions (9) and (10) are replaced with the following expression:

$$|Y(x, y)-Y(x-1, y-1)| \geq Th3 \qquad (11)$$

By using the expression (11) as the edge pixel determination reference, the amount of calculation is reduced to ½ of that in use of the above expressions (9) and (10).

If it is determined at step S150 that the color blur pixel is not an edge pixel, the process proceeds to step S152 at which smoothing processing is performed using the smoothing filter determined at steps S122 to S126 with respect to pixels within a predetermined range having the color blur pixel as a reference. Upon execution of smoothing processing, as smoothing of color difference component is effective, the smoothing processing is performed on the color difference components C1 and C2, calculated in accordance with the above equations (6) and (7), in the present embodiment.

Next, the smoothing processing using the smoothing filter will be described. In each of the smoothing filters as shown in FIGS. 8(*a*) to 8(*c*), the central value is used as a weight on the color difference components C1 and C2 of a pixel of interest in the matrix image data. The value is used for integration with respect to peripheral pixels of the pixel of interest with weighting corresponding to values of the cells of the smoothing filter. In this case, every cell has a value "1", therefore, a smoothed color difference component C1' is obtained by adding up the color difference components C1 of the respective cells and dividing by the number of the cells; a smoothed color difference component C2' is similarly obtained. The respective cells may have appropriate weights respectively. However, the use of smoothing filter means execution of the above-described matrix calculation, and therefore, if the respective cells have weights, the amount of calculation increases. That is, in the present embodiment, as the respective cells of the smoothing filters have the value "1", the data of the respective pixels may be added up and divided by the number of cells. However, in a case where the respective cells have weights, multiplication and addition are required for the number of cells, which increases the amount of calculation.

If such matrix calculation is performed with respect to all the pixels of image data, as in the conventional processing, the huge amount of calculation requires much processing time. Accordingly, the processing of the present embodiment to detect a color blur pixel and perform smoothing around the color blur pixel is expected to greatly reduce the amount of calculation, and enable high-speed image processing.

On the other hand, if it is determined at step S150 that the color blur pixel is an edge pixel, the process proceeds to step S154 at which a 5×5 pixel median filter is applied to pixels having the color blur pixel as the central pixel. Note that the size of actually-used median filter is not necessarily 5×5 pixel size, but may be 3×3 pixel size. Thus, the size of the median filter maybe appropriately selected. Then, for convenience of explanation, a case using a 3×3 pixel median filter will be described.

Figure 16:
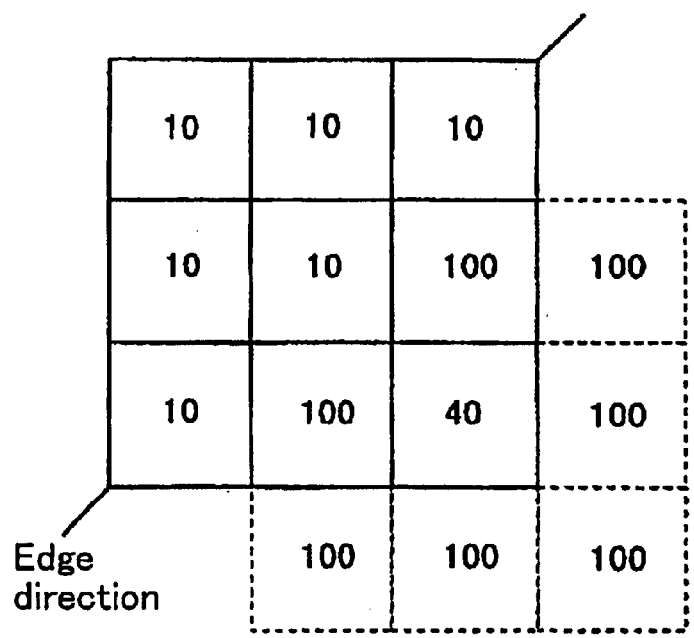
FIG. 16 is an explanatory view showing an example of color difference component values of pixels in image data of an edge portion including a color blur pixel.
Figure 17:
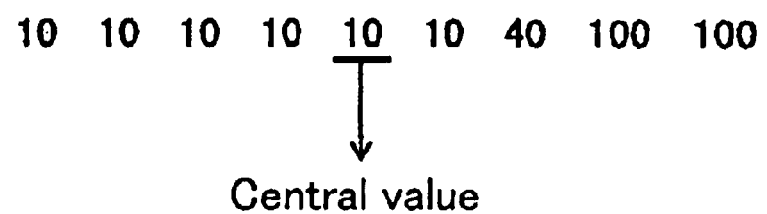
FIG. 17 is an explanatory view showing an example of calculation processing by using a median filter.

For example, as shown in FIG. 16, a 3×3 pixel dot matrix having a color blur pixel as the central pixel is considered. Note that the values of the respective cells are values of the color difference components C1. The diagonal line in FIG. 16 corresponds to an edge direction. Using the 3×3 pixel median filter means sorting the values of the color difference components C1 of the all nine pixels in ascending or descending order, selecting the central value and replacing the value with the value of the color difference component C1 of the color blur pixel. That is, in FIG. 16, six pixels have "10" C1 values, one pixel has "40" C1 value, and three pixels have "100" C1 values. If these values are sorted in ascending order, the result is as shown in FIG. 17. It is apparent from FIG. 17, the central value is "10", and the value of the color difference component C1 of the color blur pixel is "10".

On the other hand, if the 3×3 pixel smoothing filter is used, the value of the smoothed color difference component C1' is "33", obtained from dividing the total value "300", of the cell values by the number of pixels "9". As the smoothed color difference component C1' is obtained by averaging and adding up the color difference components C1 of the peripheral pixels of the color blur pixel, the image data is smoothed. The result of smoothing is equivalent to the result of so-called low-pass filtering. The image is smoothed and the color blur is inconspicuous, however, edge portions are inconveniently vague. As it is apparently understood from the above result of calculation, the application of the median filter to the edge pixel avoids blur of the edge portion.

On the other hand, referring to FIG. 16, a color blur occurs at a pixel where the value of the color difference component C1 is "40". It is understood that if the 3×3 pixel median filter is applied to this color blur pixel, as the value of the seven color difference components of the eight peripheral pixels is "100" and the value of the color difference component of the only one pixel is "10", the value of the color difference component of the color blur pixel is replaced with "100", thus the color blur is reduced. In this manner, the median filter also has an advantage to reduce a color blur while avoiding blurring an edge portion. For this reason, it is determined whether or not the color blur pixel is an edge pixel at step S150.

Note that the median filter has a 3×3 pixel size, however, if a 5×5 pixel median filter is used in the present embodiment, similarly to the case of the 3×3 pixel median filter, the central value can be selected from the total twenty-five pixels. Further, only the color difference components C1 have been described, however, the color difference components C2 may be similarly treated.

The calculation speed using the median filter is relatively lower than that using the smoothing filter. Accordingly, it is preferable that the use of median filter is avoided as much as possible. In a case where the expressions (9) and (10) are employed as the edge-pixel determination references, one of these expressions is satisfied on some occasions, and both expressions are satisfied on some occasions. If one of the expression is satisfied, it is not necessary to use the median filter with respect to the both color difference components. Further, to avoid reduction of processing speed, the median filter is used only with respect to the color difference component which satisfies the expression at step S154, while the smoothing filter is used with respect to the other color difference component at step S152. This entirely improves the processing speed. Note that in a case where the expression (11) is employed as the edge-pixel determination reference, determination is not made as to whether the change rates of the color difference values C1 and C2 are high. In this case, the median filter is applied to both color difference components C1 ad C2 at step S154.

As described above, the reduction of color blur is smoothing the image portion to be inconspicuous, which may result in a vague image portion. Accordingly, in the present embodiment, edge enhancement processing is performed at step S160.

The edge enhancement processing is performed so as to obtain the relation between unenhanced luminance Y of each pixel and enhanced luminance Y' as follows:

$$Y'=Y+(Y-\text{Yunsharp}) \quad (12)$$

Note that "Yunsharp" represents unsharp masking processing on image data of a color blur pixel. Next, unsharp masking processing will be described. In the present embodiment, as shown in FIGS. 18(a) to 18(c), three types of 3×3 pixel unsharp mask, 5×5 pixel unsharp mask and 7×7 pixel unsharp mask are prepared, in correspondence with the sizes of the smoothing filters determined at steps S122 to S126. For example, if the 3×3 pixel smoothing filter is selected, the 3×3 pixel unsharp mask is selected. Similar to the above-described smoothing filters, in each of the unsharp masks, the central value is used as a weight Y (x,y) at each pixel, and used for integrating the peripheral pixels with weighting corresponding to the values of the cells of the mask. For example, if the 3×3 pixel unsharp mask is used, integration is performed in accordance with the following expression:

$$Y\text{unsharp}=(1/136)\Sigma_{i,j}(M\ i\ j\times Y(x+i,\ y+j)) \quad (13)$$

In the expression (13), "136" is a total value of weighting coefficients. This value is the total value of the cell values in the respective smoothing filters of the different sizes. That is, in the 5×5 pixel filter, this value is "400"; and in the 7×7 pixel filter, this value is "900". "Mij" represents a weighting coefficient set in the unsharp mask cells. "Y(x,y)" represents a luminance component at each pixel. Further, "ij" is represented by horizontal and vertical coordinate values with respect to the unsharp mask.

As "Yunsharp (x,y)" is obtained by adding the values of peripheral pixels with lowered weights with respect to a color blur pixel, it is also equivalent to low-pass filtered result. Accordingly, "Y(x,y)-Yunsharp(x,y)" is equivalent to subtraction of low frequency components from all the components, i.e., high-pass filtering. Then, the high-pass filtered high frequency components are added to "Y(x,y)", i.e., the high frequency components are increased. Thus, the edge is enhanced and the image sharpness is improved.

Note that as it is apparent from FIGS. 18(a) to 18(c), in the unsharp masks, the weight coefficient becomes the greatest at the central portion, and gradually decreases towards the periphery. Accordingly, the weighting coefficients at the periphery have small influence on the total of the cell values. On the other hand, in the matrix calculation represented by the expression (13) or the like, as multiplication and addition are required for the number of cells of the used unsharp mask with respect to the peripheral pixels of a pixel of interest, the amount of calculation may be considerably great. Accordingly, in the present embodiment, the amount of calculation is reduced and the processing speed is increased by using 3×3 pixel, 5×5 pixel and 7×7 pixel unsharp masks where peripheral weighting coefficients are omitted.

Figure 19:
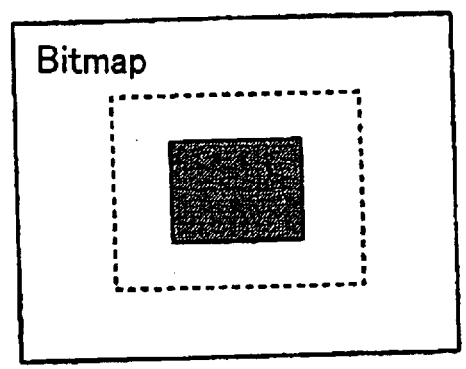
FIG. 19 is a schematic diagram showing the relation between a smoothing area and an edge enhancement area.

In the present embodiment, the size of the smoothing filter and that of the unsharp mask are the same from the following reason. For example, a bitmap image as shown in FIG. 19, a hatched area is smoothing processed, then an area surrounded by a broken line is unsharp masked for luminance enhancement. As described above, as luminance enhancement is compensation for sharpness lost by smoothing processing, if the luminance is enhanced even outside of the smoothing area, the sharpness may be unnaturally improved outside of the smoothing area. For this reason, in the present embodiment, the size of the smoothing filter and that of the unsharp mask are the same, however, the latter size may be smaller than the former size.

At step S160, edge enhancement processing as described above is performed, and R', G' and B' multilevel data are obtained based on the equations (6) to (8) using the enhanced luminance Y' and the processed color difference components. That is, the color blur is reduced at steps S152 and S154, and multilevel data is generated at step S160. The hardware construction and software to execute the above processings construct the image processing unit.

Note that at step S160, occasionally the R', G' and B' multilevel data have negative values, or the values are over "255", due to use of the enhanced luminance Y'. However, as the multilevel width ranges from "0" to "255", negative multilevel data are uniformly changed to "0", and multilevel data over "255" are uniformly changed to "255". At the next step S170, the pixel of interest is moved, and similar processing is repeated until it is determined at step S180 that all the pixels have been processed.

In a case where the smoothing filter is applied to pixels with a color blur pixel as the central pixel and then the edge enhancement processing is performed, the color blur is reduced by the smoothing processing, and the image sharpness lost by the smoothing processing is compensated by the edge enhancement processing. Accordingly, the above processings may be uniformly performed on all the color blur pixels whether the color blur pixel is an edge pixel or not, and similar advantages can be attained by this arrangement. In the above construction, empirically, as the edge portion is occasionally blurred, it is arranged such that the median filter is used if the color blur pixel is an edge pixel, to obtain excellent result.

Next, the advantages of the smoothing processing and the edge enhancement processing of the present embodiment will be described with a simple one-dimensional simulation model.

FIG. 20 is a table showing various parameter values in a one-dimensional simulation model in a case where edge enhancement processing is not performed. In FIG. 20, the left end R, G and B matrix corresponds to the color filter arrangement of a CCD. "IN" on the right side of the matrix indicates light incidence state. If the value is "1 (multilevel data value is "255")", it indicates light-irradiated state, i.e., "white". If the value is "0 (the value of multilevel data value is "0")", it indicates "black". At each CCD pixel, a color signal which cannot be directly obtained is obtained from a color signal of an adjacent pixel by linear interpolation calculation.

Initially, the simulation model should be two-dimensionally arranged, however, the central vertical array in the above RGB matrix is taken out for convenience of explanation. In this meaning, the array is referred to as a one-dimensional simulation model. From the above-described principle, false color signals (G(B)=0.5 and R=0.5) occur around the border between the white and black areas. The pixels where the false color signals have occurred are detected as color blur pixels. As the color blur pixel has been detected, the color difference components C1 and C2 are calculated in accordance with the equations (6) to (8), then the color difference components C1 and C2 are smoothing processed and color difference components C1' and C2' are obtained. Note that in this example, the values "1, 1, 1, 1, 1, 1, 1" are used as a one-dimensional smoothing filter. That is, the values of three pixels above the pixel of interest and the values of three pixels below the pixel of interest are added up and divided by "7". Then, the obtained color difference signals C1' and C2' are returned to the initial color signals based on the equations (6) to (8), and smoothing processed R', G' B' are obtained. As it is apparent from the figure, "(R', G', B')" at pixels around the border between the white and black areas are respectively, "(0.75, 0.61, 0.61)" and "(0.25, 0.11, 0.11)", closer to the initial "IN" values. Thus, the color blur is reduced.

Further, FIG. 21 is a table showing various parameter values in the one-dimensional simulation model in a case where smoothing processing is performed and edge enhancement processing is performed using the unsharp mask of the same size of the smoothing filter. In this case, similarly to the above case, the color difference components C1 and C2 are obtained and the smoothing processing is performed. When the color difference components are returned to the initial color signals by using the equations (6) to (8), a one-dimensional unsharp mask having weighting coefficients "1, 6, 18, 25, 18, 6, 1" is utilized to use the enhanced luminance signal Y'. Then, "(R', G', B')" at pixels around the border between the white and black areas are respectively "(0.81, 0.67, 0.67)" and "(0.10, −0.04, −0.04)". As a value allowable as RGB signal value ranges from "0" to "1", the latter data values actually become "(0.10, 0, 0)". In comparison with FIG. 20, the color blur is further reduced.

Further, FIG. 22 is a table showing various parameter values in the on-dimensional simulation model in a case where edge enhancement processing is similarly performed using an unsharp mask of a size smaller than that of the smoothing filter. In this case, a one-dimensional five-digit "1, 11, 25, 11, 1" unsharp mask, smaller than the smoothing filter size (seven digits), is used. Calculation is performed similarly to the above processing, and "(R', G', B')" at pixels around the border between the white and black areas are respectively "(0.79, 0.65, 0.65)" and "(0.10, −0.04, −0.04)". The color blur is not sufficiently reduced in comparison with FIG. 21, however, it is further reduced in comparison with FIG. 20.

Next, the operation of the present embodiment having the above construction will be described.

A case where an image obtained by the digital still camera 12 having a single-plate CCD is inputted into the computer 21, and printing is performed by the printer 31 is considered. First, while the operating system 21a is running in the computer 21, the image processing application 21d is started, and image data is read from the digital still camera 12. When the image data has been read by the image processing application 21d via the operating system 21a, an index value for determination of the image size based on the equation (1) is obtained at step S110. The index value is compared with a predetermined threshold value, and the size of the smoothing filter and that of the unsharp mask used at steps S122 to S126 are determined. The determined sizes are stored in the work area.

At step S130, the pixel of interest is set to an initial position, and the ΔRB value between the pixel of interest and a peripheral pixel is calculated in accordance with the equation (2). Thereafter, at step S140, the change rate of the ΔRB value is examined between the pixel of interest and its peripheral pixel based on the expression (5). If the change rate is higher than the predetermined threshold value Th, it is determined that the pixel of interest is a color blur pixel.

If it is determined that the pixel of interest is a color blur pixel, the color difference components C1 and C2 are calculated based on the equations (6) to (8) between the pixel of interest and its peripheral pixel at step S150. Then, it is determined whether or not the pixel of interest is an edge pixel, in accordance with the determination reference such as the expression (10) or (11). If it is determined that the color blur pixel is not an edge pixel, a smoothing filter corresponding to the filter size, stored at steps S122 to S126, is employed at step S152. That is, with respect to the color difference components C1 and C2, the color difference components at pixels corresponding to the cells of the smoothing filter are added up and divided by the number of cells, so that the smoothing processed color difference components C1' and C2' are obtained.

On the other hand, if it is determined at step S150 that the color blur pixel is an edge pixel, the 5×5 pixel median filter is applied to pixels with the color blur pixel as the central pixel at step S154. That is, the color difference component values of the total twenty-five pixels with the color blur pixel as the central pixel are sorted in ascending or descending order, then the central value is selected and replaced with the color difference component value of the color blur pixel. At this time, if the determination references of the expressions (9) and (10) are employed at step S150, the median filter is used with respect to any of the color difference components C1 or C2 which satisfies the expression (9) or (10), at step S154, while the above-described smoothing filter is used with respect to the color difference component which does not satisfy the expression (9) or (10), at step S152. If both color difference components satisfy both expressions (9) and (10), the median filter is used with respect to the color difference components C1 and C2 at step S154. On the other hand, if the determination reference of the expression (11) is employed at step S150, the median filter is used with respect to both color difference components C1 and C2 at step S154.

Thereafter, at step S160, the low frequency components Yunsharp of the luminance components Y are obtained with respect to the pixel of interest and its peripheral pixels by using the unsharp mask of the size determined at steps S122 to S126, and further, the high frequency components are obtained by subtracting the low frequency components Yunsharp from the initial luminance components Y. Then, the high frequency components are added to the initial luminance components Y to obtain the enhanced luminance components Y'. More specifically, calculation is performed based on the expression (13) or the like. Then, the smoothing processed R', G' and B' multilevel data are obtained based on the equations (6) to (8) using the enhanced luminance components Y' and the processed color difference components. The above processing is repeated while the pixel of interest is moved until it is determined at step S180 that all the pixels have been processed.

When all the pixels have been processed, the image processed data is displayed on the display 32 via the display driver 21c. If the display is excellent, the data is print-outputted by the printer 31 via the printer driver 21b. That is, the printer driver 21b inputs the color-blur reduced RGB multilevel data, and performs rasterization corresponding to the printhead area of the printer 31 through predetermined resolution conversion. Then, the printer driver 21b color-converts the rasterized data from RGB to CMYK data, and further, converts the CMYK multilevel data into binary data and outputs the data to the printer 31.

By the above processing, the image data obtained by the digital still camera 12 is automatically image-processed such that only a color blur at a color blur portion is reduced, then displayed on the display 32, and print-outputted by the printer 31. That is, as image processing is performed so as to reduce the color blur at the color blur portion, the amount of calculation is reduced and high-speed image processing is realized.

In this manner, the computer 21 as the nucleus of the image processing determines at steps S130 and S140 whether or not the pixel of interest is a color blur pixel based on low-density element color intensity, and if the computer 21 determines that the pixel of interest is a color blur pixel, it determines at step S150 whether or not the color blur pixel is an edge pixel. If the color blur pixel is not an edge pixel, the computer 21 performs image processing by using the smoothing filter on the pixel at step S152, while if the color blur pixel is an edge pixel, the computer 21 performs image processing by using the median filter at step S154, so as to reduce the color blur. Thus, the amount of calculation is reduced, and high-speed image processing is realized.

The above-described embodiment is realized by software processing in the computer system 10. However, the present invention can be easily realized by hardware circuits. In this case, the present invention is realized by a memory for reading image data, IC circuits or the like for realizing the processings at the respective steps in the flowchart of FIG. 6 one of the IC circuits is a color-blur pixel detection circuit for accessing the image memory to scan the position of a pixel of interest at S170 and S180, and detecting existence/absence of color blur at each pixel of interest; another one of the IC circuits is a color-blur reduction processing circuit for accessing peripheral pixels around a pixel of interest, determined to be a color blur pixel in correspondence with the processing at steps S140 to S160, as the reference, using the smoothing filter or median filter to reduce the color blur, and fully performing edge enhancement. The respective IC circuits are accompanied by other hardware circuits. In this case, the color-blur pixel detection circuit corresponds to the above-described color-blur pixel detection unit, and the color-blur reduction processing circuit corresponds to the above-described image processing unit.

As many apparently widely different embodiments of the present invention can be made without departing from the spirit and scope thereof, it is to be understood that the invention is not limited to the specific embodiments thereof except as defined in the appended claims.

We claim:

1. An image processing apparatus performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said apparatus comprising:

a color-blur pixel detection unit detecting a color blur pixel in said image data; and an image processing unit performing image processing on pixels, each of the pixels having data from all the element colors, the pixels being within a predetermined range having said detected color blur pixel as a reference pixel, so as to reduce a color blur; wherein said color-blur pixel detection unit detects said color blur pixel based on change rate of element color intensity for a low-density color filter, between closely adjacent pixels.

2. The image processing apparatus according to claim 1, wherein said color-blur pixel detection unit detects said color blur pixel based on the change rate of difference between a reference element color intensity and the element color intensity for a lowdensity color filter, between adjacent pixels.

3. The image processing apparatus according to claim 2, wherein if there are a plurality of low-density color filters, said color-blur pixel detection unit detects said color blur pixel based on the change rate of difference between element color intensities for the low-density color filters between adjacent pixels.

4. The image processing apparatus according to claim 1, wherein said color-blur pixel detection unit detects said color blur pixel based on said change rate between adjacent low-density pixels.

5. The image processing apparatus according to claim 1, wherein said image processing unit performs smoothing processing on color difference components, obtained by subtracting luminance components from element color components of the pixels within the predetermined range having said color blur pixel as the reference pixel, and returns the smoothing processed components to initial element color components.

6. The image processing apparatus according to claim 5, wherein said image processing unit performs edge enhancement processing.

7. The image processing apparatus according to claim 6, wherein said image processing unit performs edge enhancement processing on pixels within a range subjected to the smoothing processing.

8. An image processing apparatus performing image processing on image data consisting of dot-matrixed pixels, output from an input device which generates the image data by obtaining image data by a single-plate solid image pickup device where a plurality of color filters of element color components are arranged in mosaic, said apparatus comprising:

a color-blur pixel detection unit detecting a color blur pixel in said image data; and an image processing unit performing image processing on pixels within a predetermined range having said detected color blur pixel as a reference pixel, so as to reduce a color blur;

wherein said image processing unit performs smoothing processing on color difference components, obtained by subtracting luminance components from element color components of the pixels within the predetermined range having said color blur pixel as the reference pixel, and returns the smoothing processed components to initial element color components; and wherein when said image processing unit performs the smoothing processing on the pixels within the predetermined range having said detected color blur pixel as the reference pixel, if the size of a processing object image is large, said image processing unit increases the range subjected to the smoothing processing, while if the size of the image is small, said image processing unit reduces the range subjected to the smoothing processing.

9. An image processing apparatus performing image processing on image data consisting of dot-matrixed pixels, output from an input device which generates the image data by obtaining image data by a single-plate solid image pickup device where a plurality of color filters of element color components are arranged in mosaic, said apparatus comprising:

a color-blur pixel detection unit detecting a color blur pixel in said image data; and an image processing unit performing image processing on pixels within a predetermined range having said detected color blur pixel as a reference pixel, so as to reduce a color blur;

wherein said image processing unit replaces a color difference component having a central value of color difference components, obtained by subtracting luminance components from element color components of the pixels within the predetermined range having said color blur pixel as the reference pixel, with a color difference component of said color blur pixel, and returns the color difference components to initial element color components.

10. An image processing apparatus performing image processing on image data consisting of dot-matrixed pixels, output from an input device which generates the image data by obtaining image data by a single-plate solid image pickup device where a plurality of color filters of element color components are arranged in mosaic, said apparatus comprising:

a color-blur pixel detection unit detecting a color blur pixel in said image data; and an image processing unit performing image processing on pixels within a predetermined range having said detected color blur pixel as a reference pixel, so as to reduce a color blur;

wherein said image processing unit determines whether or not said color blur pixel is an edge pixel, and if said image processing unit determines that said color blur pixel is an edge pixel, replaces a color difference component having a central value of color difference components, obtained by subtracting luminance components from element color components of the pixels within the predetermined range having said color blur pixel as the reference pixel, with a color difference component of said color blur pixel, while if said image processing unit determines that said color blur pixel is not an edge pixel, performs the smoothing processing on the color difference components, obtained by subtracting the luminance components from the element color components of the pixels within the predetermined range having said color blur pixel as a reference pixel, and returns the color difference components to initial element color components.

11. An image processing apparatus performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said apparatus comprising:

a memory in which said image data being stored;

a color-blur pixel detection circuit accessing said memory and detecting a position of a color blur pixel based on the difference between a pixel of interest and its peripheral pixel while sequentially moving the pixel of interest; and a color-blur reduction processing circuit reading data of pixels, each of the pixels having data from all the element colors, the pixels being within a predetermined range having the pixel of interest, detected as the color blur pixel, as a reference pixel, then performing calculation to reduce a color blur, and updating data of the pixel of interest stored in said memory with calculated data, wherein said color-blur pixel detection unit detects said color blur pixel based on change rate of element color intensity for a low-density color filter, between closely adjacent pixels.

12. An image processing method for performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said method comprising the steps of:

detecting a color blur pixel in said image data; and performing image processing on pixels, each of the pixels having data from all the element colors, the pixels being within a predetermined range having said color blur pixel as a reference pixel so as to reduce a color blur, wherein said detection of said color blur pixel is based on change rate of element color intensity for a low-density color filter, between closely adjacent pixels.

13. A medium containing an image processing control program for an image processing apparatus performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said program executes image processing comprising:

detecting a color blur pixel in said image data; and performing image processing on pixels, each of the pixels having data from all the element colors, the pixels being within a predetermined range having said color blur pixel as a reference pixel so as to reduce a color blur, wherein said detection of said color blur pixel is based on change rate of element color intensity for a low-density color filters between closely adjacent pixels.

14. An image processing apparatus performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said apparatus comprising:

a color-blur pixel detection unit detecting a color blur pixel in said image data; and an image processing unit performing image processing on pixels, each of the pixels having data from all the element colors, the pixels being within a predetermined range having said detected color blur pixel as a reference pixel, so as to reduce a color blur, wherein said image processing unit performs smoothing processing on color difference components, obtained by subtracting luminance components from element color components of the pixels within the predetermined range having said color blur pixel as the reference pixel, and returns the smoothing processed components to initial element color components.

15. The image processing apparatus according to claim 14, wherein said image processing unit performs edge enhancement processing.

16. The image processing apparatus according to claim 15, wherein said image processing unit performs edge enhancement processing on pixels within a range subjected to the smoothing processing.

17. An image processing apparatus performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said apparatus comprising:

a color-blur pixel detection unit detecting a pixel having a high ΔRB change rate between adjacent pixels, wherein the pixel having the high ΔRB change rate is regarded as a color blur pixel in said image data; and an image processing unit performing image processing on pixels, each of the pixels having data from all the element colors, the pixels being within a predetermined range having said color blur pixel as a reference pixel, so as to reduce a color blur.

18. An image processing method for performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said method comprising:

detecting a pixel having a high ΔRB change rate between adjacent pixels, wherein the pixel having the high ΔRB change rate is regarded as a color blur pixel in said image data; and performing image processing on pixels, each of the pixels having data from all the element colors, the pixels being within a predetermined range having said color blur pixel as a reference pixel so as to reduce a color blur.

19. A medium containing an image processing control program for an image processing apparatus performing image processing on image data consisting of dot-matrixed pixels, each of the dot-matrixed pixels having color element data from all element colors, the dot-matrixed pixels being output from an input device which generates the image data by obtaining image data by a single-plate solid image pickup device where a plurality of color filters of element color components are arranged in mosaic, said program executes image processing comprising:

detecting a pixel having a high ΔRB change rate between adjacent pixels, wherein the pixel having the high ΔRB change rate is regarded as a color blur pixel in said image data; and performing image processing on pixels, each of the pixels having data from all the element colors, the pixels being within a predetermined range having said color blur pixel as a reference pixel so as to reduce a color blur.

* * * * *